United States Patent
Thurner

(10) Patent No.: US 10,382,736 B1
(45) Date of Patent: Aug. 13, 2019

(54) TWO FREQUENCY TIME-OF-FLIGHT THREE-DIMENSIONAL IMAGE SENSOR AND METHOD OF MEASURING OBJECT DEPTH

(71) Applicant: Infineon Technologies AG, Neubiberg (DE)

(72) Inventor: Thomas Thurner, Graz (AT)

(73) Assignee: Infineon Technologies AG (DE)

( * ) Notice: Subject to any disclaimer, the term of this patent is extended or adjusted under 35 U.S.C. 154(b) by 0 days.

(21) Appl. No.: 15/892,706

(22) Filed: Feb. 9, 2018

(51) Int. Cl.
| | |
|---|---|
| G01S 17/06 | (2006.01) |
| H04N 13/106 | (2018.01) |
| G01S 17/89 | (2006.01) |
| G01S 17/46 | (2006.01) |
| G01S 7/491 | (2006.01) |
| H04N 13/211 | (2018.01) |
| H04N 13/254 | (2018.01) |
| H04N 13/296 | (2018.01) |
| H04N 13/00 | (2018.01) |

(52) U.S. Cl.
CPC ......... H04N 13/106 (2018.05); G01S 7/4914 (2013.01); G01S 17/46 (2013.01); G01S 17/89 (2013.01); H04N 13/211 (2018.05); H04N 13/254 (2018.05); H04N 13/296 (2018.05); *H04N 2013/0081* (2013.01)

(58) Field of Classification Search
CPC combination set(s) only.
See application file for complete search history.

(56) References Cited

U.S. PATENT DOCUMENTS

| | | | |
|---|---|---|---|
| 9,769,456 B2 * | 9/2017 | You | G01S 17/06 |
| 2011/0188028 A1 * | 8/2011 | Hui | G01C 3/08 |
| | | | 356/5.01 |
| 2015/0103330 A1 * | 4/2015 | Wilks | G01S 17/36 |
| | | | 356/5.01 |
| 2016/0138910 A1 * | 5/2016 | You | G01S 17/06 |
| | | | 348/46 |

(Continued)

OTHER PUBLICATIONS

Infineon Technologies AG, (2015), REAL3™ image sensor family: 3D depth sensing based on Time-of-Flight; pp. 1-2.

(Continued)

*Primary Examiner* — Howard D Brown, Jr.
(74) *Attorney, Agent, or Firm* — Design IP

(57) ABSTRACT

A three-dimensional image system includes a modulator configured to generate a first and a second modulation signal having a predetermined frequency difference, an illumination source configured to generate a light signal modulated by the first modulation signal, and a pixel array modulated by the second modulation signal. At least one pixel of the pixel array is configured to receive a reflected modulated light signal and generate a plurality of measurement signals based on a plurality of image acquisitions taken at different acquisition times. A controller is configured to control a phase difference between the first modulation signal and the second modulation signal by setting the first modulation frequency and the second modulation frequency to have a predetermined frequency difference greater than zero; and calculate a depth of the object based on the plurality of measurement signals, the depth being a distance from the 3DI system to the object.

20 Claims, 3 Drawing Sheets

(56) References Cited

U.S. PATENT DOCUMENTS

2016/0205378 A1* 7/2016 Nevet .................. H04N 13/254
                                                   348/47
2017/0234985 A1* 8/2017 Kadambi ................ G01S 17/10
                                                   702/152
2018/0106891 A1* 4/2018 Thurner .................. G01S 7/497

OTHER PUBLICATIONS

U.S. Appl. No. 15/297,512, filed Oct. 19, 2016; not yet published.

* cited by examiner

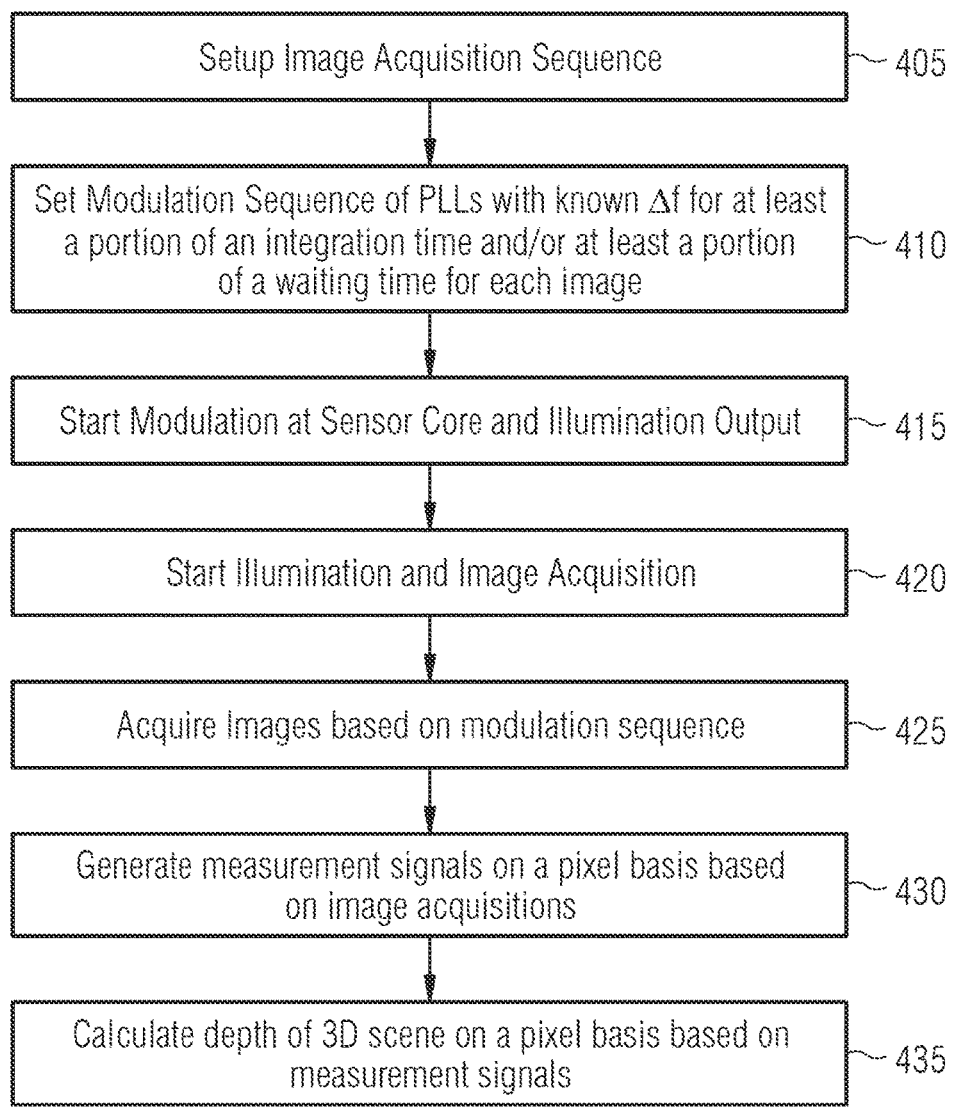

TWO FREQUENCY TIME-OF-FLIGHT THREE-DIMENSIONAL IMAGE SENSOR AND METHOD OF MEASURING OBJECT DEPTH

FIELD

The present disclosure relates generally to devices and methods related to three-dimensional image (3DI) sensors, and, more particularly, to measuring an object depth using a two frequency principle.

BACKGROUND

Indirect time-of-flight (ToF) three-dimensional image (3DI) image sensors are based on continuously modulated light for scene illumination, and demodulation of the received light on a pixel level during integration phases. Depth information is obtained by a calculation of pixel values from several image acquisitions with pre-defined and constant phase steps between light emission and pixel modulation. For example, four depth images may be used with discrete (congruent) phase differences of 0°/90°/180/270° to estimate the depth value for each pixel. However, because these phase differences must be congruent, the system lacks of flexibility.

Given deviations from ideal signal waveforms in illumination and pixel modulation in combination with these pre-defined phase-steps leads to systematic error components—so-called wiggling error—which needs to be calculated at least at camera assembly using an electronic calibration box which can lead to increased costs in both time and expense for manufacturers. Furthermore, the measurement accuracy is limited by the number of used phase steps and the pre-configured wiggling calibration. High speed 3D depth measurement is also not possible since at least four frame readouts are typically used, with extensive calculations for subsequent depth estimation. Also, complex phase shifters are needed to maintain highly precise, unchanging phase steps which lead to increased complexity and effort for the 3DI sensor application specific integrated circuits (ASICs).

Therefore, a depth measurement procedure that simplifies the effort, allows for high measurement accuracy or high measurement rate, and reduces costs for ToF 3DI cameras and sensor chips may be desired.

SUMMARY

Systems, devices and methods are provided for measuring a depth of an object using Time-of-Flight (ToF) three-dimensional image (3DI) cameras and sensors.

One or more embodiments provide a 3DI system that includes a modulator configured to generate a first modulation signal having a first modulation frequency and a second modulation signal having a second modulation frequency; an illumination source configured to generate a modulated light signal based on the first modulation signal; a sensor core including a pixel array modulated by the second modulation signal, where at least one pixel of the pixel array is configured to receive the modulated light signal reflected from an object as a reflected modulated light signal and to demodulate the reflected modulated light signal using the second modulation signal during an image acquisition to generate a measurement signal, where the at least one pixel is configured to generate a plurality of measurement signals based on a plurality of image acquisitions taken at different acquisition times; and a control unit including at least one processor. The control unit is configured to control a phase difference between the first modulation signal and the second modulation signal by setting the first modulation frequency and the second modulation frequency to have a predetermined frequency difference greater than zero; control the sensor core to initiate the plurality of image acquisitions at the different acquisition times; receive the plurality of measurement signals, and calculate a depth of the object based on the plurality of measurement signals, where the depth is the distance from the 3DI system to the object.

One or more embodiments provide a method of measuring a depth of an object by a three-dimensional image (3DI) system. The method includes generating a first modulation signal having a first modulation frequency; generating a second modulation signal having a second modulation frequency; generating a modulated light signal based on the first modulation signal; modulating a pixel array by the second modulation signal; generating a plurality of measurement signals based on a plurality of image acquisitions taken at different acquisition times based on at least one pixel of the pixel array receiving the modulated light signal reflected from the object as a reflected modulated light signal; controlling a phase difference between the first modulation signal and the second modulation signal by setting the first modulation frequency and the second modulation frequency to have a predetermined frequency difference greater than zero; initiating the plurality of image acquisitions at the different acquisition times; receiving the plurality of measurement signals; and calculating the depth of the object based on the plurality of measurement signals, where the depth is the distance from the 3DI system to the object.

BRIEF DESCRIPTION OF THE DRAWINGS

Embodiments are described herein making reference to the appended drawings.

FIG. 4 illustrates a flow diagram of a depth measurement operation according to one or more embodiments.

DETAILED DESCRIPTION

Figure 1:
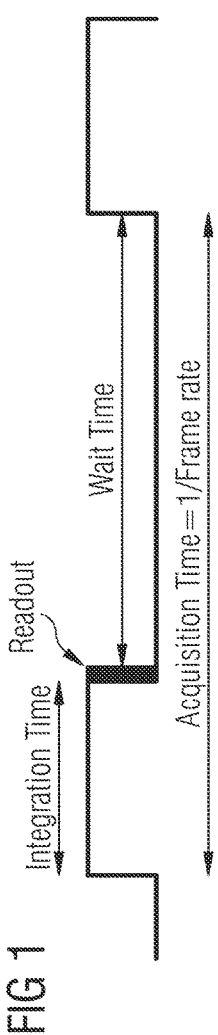
FIG. 1 illustrates an example of an image acquisition time for an image acquisition.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to sensors and sensor systems and to obtaining information about sensors and sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. As used herein, IR radiation may also be referred to as IR light.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

More specifically, the embodiments related to a three-dimensional (3D) image sensor configured to determine a depth (i.e., a distance) from a depth camera, or more specifically from a pixel array, to an object using a time-of-flight (ToF) principle. In general, light is transmitted from the depth camera and is reflected back by the object. The reflected light is received by a pixel array, where, on a pixel-by-pixel basis, the reflected light is demodulated during an image acquisition to generate a measurement signal. Each pixel may be also configured to perform multiple image acquisitions at different acquisition times, and thereby generate multiple measurement signals therefrom.

FIG. 1 illustrates an example of an image acquisition time for an image acquisition. An image acquisition includes three phases: (1) an integration phase, (2) a data readout phase, and (3) a waiting phase. Thus, each phase has a corresponding time period associated therewith (e.g., an integration time, a readout time, and a waiting time). The acquisition time as a whole takes up a fraction of a frame rate (e.g., 1/frame rate).

During the integration phase, an optically active pixel performs active demodulation on the reflected light signal and generates pixels values (i.e., stored charges) based on the received light signal.

During the data readout phase, the pixel values (i.e., the stored charges) are readout as data (e.g., a measurement signal) and sent to a processing unit for further processing. For example, the pixel values may be read out, undergo an analog-to-digital conversion by an analog-to-digital converter (ADC) to digital values, and then transferred to the processing unit (e.g., for depth calculation). It will also be appreciated that the ADCs may be integrated with the processing unit.

During the waiting phase, a pixel waits for the start of the next integration phase (i.e., for the next image acquisition).

Alternatively, a waiting phase may not be used or may be skipped for some image acquisitions. For example, a second (subsequent) integration time (i.e., for a new image acquisition) could be started at part of the readout time of a first (current) image acquisition, e.g., after transfer of the photon-generated charges to a storage gate in the pixel structure. In that case, a remaining readout of the first image acquisition can be performed during second integration time to minimize acquisition times overall (i.e., to maximize framerate) for 3DI sensors that are built for that purpose.

Figure 2:
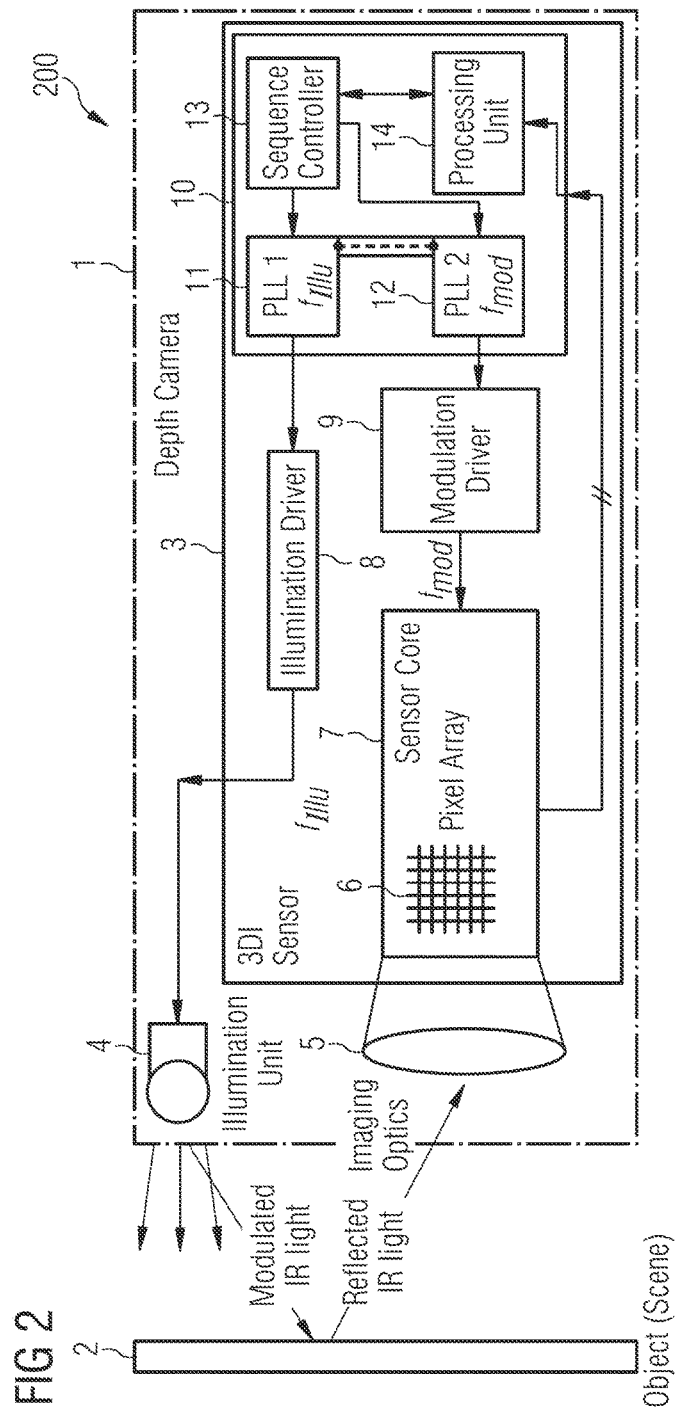
FIG. 2 is a schematic block diagram of a three-dimensional (3D) depth camera system according to one or more embodiments.

FIG. 2 is a schematic block diagram of a three-dimensional (3D) depth camera system 200 according to one or more embodiments. The 3D depth camera system 200 includes a 3D depth camera 1 and an object 2. The object 2 may be one or more objects that make up a 3D scene for imaging. The 3D depth camera system 200 uses a ToF-based 3DI sensor concept, using indirect depth measurement with continuously modulated illumination signals sourcing an illumination unit, and a modulated sensor core, where on pixel-basis received light is demodulated by a pixel modulation signal.

The 3D depth camera 1 may include a sensor chip 3 that includes various components for performing depth measurement, an illumination unit 4, and imaging optics 5 (e.g., a lens). The illumination unit 4 may be an illumination source such as a such as a light emitting diode (LED) or a vertical-cavity surface-emitting laser (VCSEL) configured to emit a modulated light signal (e.g., modulated IR light), or any other suitable light source configured to emit a modulated illumination signal (e.g., modulated IR light or light signal). The illumination unit 4 may be configured to emit the modulated IR light towards the object 2, and the imaging optics 5 (e.g., a lens) may be configured to receive reflected modulated IR light that is reflected from the surface of the object 2. It will be appreciated that the terms "light signal", "IR light", and "illumination signal" may be used interchangeably herein.

The illumination unit 4 may be further configured to emit the modulated IR light towards the object 2 using illumination optics (e.g., a lens or a diffractive optical element (DOE)). Thus, using the illumination optics, the illumination unit 4 may illuminate only a field of view (FOV) of the image sensor 1.

The imaging optics 5, which may be a imaging lens system or objective including one or more lenses or DOEs, is configured to receive reflected IR light that is reflected from object 2 (i.e., objects of a 3D scene). The reflected light is directed by the imaging optics 5 at a pixel array 6 of a sensor core 7.

The sensor chip 3 includes the sensor core 7, which includes pixel array 6, an illumination driver 8, a modulation driver 9, and a control unit 10. The control unit includes two phase lock loop (PLL) circuits 11 and 12, a sequence controller 13, and a processing unit 14. The PLL circuits 11 and 12, together, may form a modulator to modulate one or more driver signals.

A first PLL 11 may be configured to control a modulation signal $f_{Illu}$ via the illumination driver 8 and a second PLL 12 may be configured control a modulation signal $f_{mod}$ via the modulation driver 9. Thus, under control of the first PLL 11, the illumination driver 8 is configured to generate the illumination modulation signal $f_{Illu}$ having a first modulation frequency. Similarly, under control of the second PLL 12, the modulation driver 9 is configured to generate the sensor core (pixel) modulation signal $f_{mod}$ having a second modulation frequency. The PLLs 11 and 12 are configured such that the first and the second modulation frequencies have a predetermined frequency difference greater than zero for at least a portion of the image acquisition time for each of the image acquisitions.

Thus, the 3D depth camera 1 is configured to emit modulated IR light and measure the time the IR signal takes to travel from the depth camera 1 to the 3D scene 3 and back again. The elapsed time, referred to as a "time-of-flight," enables the 3D depth camera 1 to generate raw image data on a pixel-by-pixel basis and output the raw image data to the processing unit 14. In particular, the 3D depth camera 1 may be a continuous modulation ToF camera that measures the time-of-flight by using or determining a phase difference between the reflected modulated light and the modulation signal $f_{mod}$. For example, a phase difference can be translated to a distance based on the known frequency difference and an image acquisition time. Thus, a depth (distance) to the object can be determined from the phase difference information determined upon receipt of the reflected modulated light.

As will be described in more detail below, the predetermined frequency difference may be set to be greater than zero for all or part of an integration time, all or part of a waiting time, or for all or part of an image acquisition time for each of a multiple image acquisitions taken at different image acquisition times. At other times, the frequencies of the modulation signals $f_{mod}$ and $f_{Illu}$ may be equal such that there is no frequency difference therebetween.

During depth measurement, the illumination driver 8 may be configured to receive a control signal from the first PLL 11, and output the modulation signal $f_{Illu}$ to the illumination unit 4 according to the control signal. The illumination unit 4 then generates a modulated light signal based on the illumination modulation signal $f_{Illu}$.

During depth measurement, the modulation driver 9 may be configured to receive a control signal from the second PLL 12, and output the sensor core modulation signal $f_{mod}$ to a pixel array 6 of a sensor core 7 according to the control signal. While not shown, the modulation driver 9 may generate a plurality of modulation signals $f_{mod}$ that are received by the sensor core 7, each with a same modulation frequency and phase, to control the modulation frequency of the ToF pixels of the pixel array 6. Thus, when modulation signal $f_{mod}$ is referenced herein, it will be understood that this may include one or more signals with the same modulation frequency and phase for modulating the pixels of the pixel array 6.

The pixel array 6 may be a 224×172 pixel matrix, but is not limited thereto. The pixel array 6 may be configured to receive the reflected IR signal from the imaging optics 5 and demodulate the reflected IR signal using the modulation signal $f_{mod}$ such that a phase difference (i.e., phase shift) between the modulated (reflected) illumination signal and the modulated pixel array 6 (e.g., signal $f_{mod}$) may be detected and measured. In particular, the pixel array 6 may be configured to directly demodulate the reflected light.

Said differently, the sensor core 7 includes the pixel array 6 modulated by the pixel modulation signal $f_{mod}$, and a pixel of the pixel array 6 is configured to receive the modulated light signal reflected from object 2 as a reflected modulated light signal. The pixel of the pixel array 6 is further configured to demodulate the reflected modulated light signal using the pixel modulation signal $f_{mod}$ during an image acquisition to generate a measurement signal. The pixel is configured to generate a plurality of measurement signals based on a plurality of image acquisitions taken at different image acquisition times. Each pixel or a subset of pixels of the pixel array 6 may perform a similar process.

The processing unit 14 may be configured to receive the plurality of measurement signals from each pixel (e.g., a plurality of measurement signals from each pixel) and calculate the depth of the object 2 on a pixel-by-pixel basis based on the plurality of measurement signals using phase difference information embedded in each measurement signal. In particular, the processing unit 14 may calculate an absolute phase difference based on the phase difference values associated with the measurement signals for each pixel, and translate the absolute phase difference into depth (distance) information. Thus, a 3D image of the object 2 can be generated, output, and/or displayed.

When the predetermined frequency difference between modulation signals $f_{mod}$ and $f_{Illu}$ is greater than zero, it introduces a linearly increasing phase difference between the modulation signals $f_{mod}$ and $f_{Illu}$ over time, where the phase change rate is dependent on the frequency difference (e.g., the larger the frequency difference, the faster the phase change rate will be). Since the phase of the modulated IR light, and consequently, the phase of the reflected IR light is the same as the phase of the first modulated signal, the predetermined frequency difference causes a phase difference between the reflected modulated light signal and the sensor core modulation signal $f_{mod}$ over time. This phase difference can be determined at the pixel level when the reflected modulated light signal is received for determining an object depth and for generating a 3D image.

This phase difference is time-dependent, it grows linearly with time, and it can be calculated based on the following equation: $\varphi(t)=\varphi_0+2^*pi^*\Delta f^*t$, where $\varphi_0$ is the initial phase difference at time 0, $\Delta f=f_{Illu}-f_{mod}$, and t is the elapsed time. As an example, a frequency difference of 100 Hz then leads to the full 360° phase shift for a time duration of 10 milliseconds.

In addition, a simulated distance over time between the sensor core 7 (e.g., the pixel array 6) and the object 2 may be calculated based on the following equation: $z(t)=z_0+\Delta f^*\lambda/2^*t$, where $z_0$ is the initial (known or determined) distance and $\lambda$ is the modulation wavelength of the illumination signal. Here, $\lambda$ is equal to $c/f_{Illu}$, where c is the speed of light (3.10^8 m/s) and $f_{Illu}$ is the frequency of the illumination signal (e.g., 100 MHz). For given values $\lambda=(3.10^8 \text{ m/s})/(1.10^8 \text{ Hz})=3$ m, which enables unambiguous depth measurement of objects up to a 1.5 m distance from the 3DI sensor since the total light travel distance to and from the object is 3 m.

With this indirect ToF-based 3DI sensor, a phase difference (i.e., a phase shift) between the pixel modulation signal $f_{mod}$ and the illumination modulation signal $f_{Illu}$ is translated to distance. The phase difference is determined since the frequency difference over an in advance chosen period of time is known and since the phase difference grows linearly with time at a rate dependent on the frequency difference. To estimate depth information of object 2, multiple image acquisitions may be taken with arbitrary phase differences (e.g., three or four phase steps) introduced between the two modulation signals $f_{mod}$ and $f_{Illu}$. As used herein, "arbitrary" means not constant over a sequence of steps (e.g., between image acquisitions). Thus, the phase difference between phase steps does not have to be equally spaced apart and may be "arbitrary."

In principle, at least three image acquisitions with different suitable phase steps are used for each single depth measurement, and more particularly, four or more image acquisitions may be used. For example, each of the plurality of measurement signals includes information representative of a phase difference between the reflected modulated light signal and the second modulation signal at a corresponding acquisition time, and depth information of the object 2 can be calculated by the processing unit 14 from the measurement signals. However, in some cases, only a single image acquisition may be needed to obtain an update on the depth estimation when unchanged external conditions can be used.

Thus, a sequence of raw images is obtained using the arbitrary phase steps, where each image contains distance information. Due to an unknown offset and gain in the pixel raw signals, as a result of an unknown reflected light intensity and phase (i.e., unknown target reflectivity and distance), at least three independent measurements may be used for estimation of the phase difference between the sensor pixel modulation and the returning light. The phase difference has a systematic offset for all pixels (i.e., a per pixel fixed pattern phase noise (FPPN)) due to systematic time delays in the illumination signal and the per pixel modulation signals, and can be directly calculated into a distance (depth) for the unambiguous phase/distance range when a frequency difference is used by knowing the modulation frequency of the illumination signal $f_{Illu}$ and the speed of light.

The sequence controller 13 may include one or more processors and a clock source, and may be configured to control each of the PLLs 11 and 12. That is, the sequence controller 13 may be configured to control the modulation frequencies implemented by the PLLs 11 and 12 for controlling the two modulation signals $f_{mod}$ and $f_{Illu}$ and the frequency difference therebetween. The sequence controller 13 may be an internal controller logic with which the processing unit 14 can communicate with or through which the processing unit 14 may parametrize the depth camera 1 in order to control one or more of the pixel modulation and illumination modulation frequencies of $f_{mod}$ and $f_{Illu}$, respectively, the duration and timing of introducing the frequency difference during each image acquisition provided by the PLLs 11 and 12, or the definition of an image sequence having defined frame rate.

The first PLL circuit 11 and the second PLL circuit 12 may be coupled to each other such that they share a common clock source (e.g., provided by the sequence controller 13). Thus, the two frequencies of the illumination modulation signal $f_{Illu}$ and the pixel modulation signal $f_{mod}$ are coupled to each other and can be derived from the same clock frequency. This allows for the frequency difference between the two frequencies to be constant and precise based on a desired frequency difference. In the event the frequency difference is greater than zero, it can be ensured that the phase difference between the modulation signals $f_{mod}$ and $f_{Illu}$ grows continuously and linearly over time in a consistent and expected manner. In the event that there is no frequency difference, it can be ensured that the phase difference between the modulation signals $f_{mod}$ and $f_{Illu}$ does not change over time and remains constant.

Thus, these two PLLs 11 and 12 may be programmed by the sequence controller 13 such that they differ slightly in frequency (e.g., a frequency difference 1 Hz or 0.1 Hz for modulation frequency of 80 MHz for example). A synchronous start of the two PLLs 11 and 12 for sensor pixel modulation and illumination signal modulation can be achieved to start at phase difference of 0°, with a constant and continuously growing phase difference between the two modulation signals $f_{Illu}$ and $f_{mod}$ for at least part of an image acquisition time. That is, the frequency difference between the two modulation signals $f_{Illu}$ and $f_{mod}$ introduces a linear phase shift growing linearly with time. In principal, also a phase differences of greater than 360° can be used (phase ambiguity). By programming a certain frame rate, integration time, and waiting time, for example, by the processing unit 14, arbitrary but very precise and easily calculated phase differences can be chosen or determined for depth measurement.

The phase difference may also set by the sequence controller 13 to be constant for at least part of an image acquisition by setting the frequency of the illumination modulation signal $f_{Illu}$ to be the same as the frequency of the pixel modulation signal $f_{mod}$. In this case, the frequency difference is equal to zero (i.e., there is no frequency difference) and the phase difference between the modulation signals $f_{mod}$ and $f_{Illu}$ does not change over time.

This programming of the set frequency difference allows a precisely controllable and, if wanted, continuously changeable phase difference between pixel modulation signal $f_{mod}$ and the illumination modulation signal $f_{Illu}$ for the 3DI sensor. At other times, there may be no frequency difference, which provides a constant, unchanging phase difference for a certain period of time during an image acquisition time.

It will be appreciated that, while the use of two PLLs are described, other equivalent structures are also possible. For example, structures with a combined PLL or modulator structure may be implemented where the two different frequencies can be obtained. For example, a combined PLL structure may be implemented where the two different frequencies of the modulation signals $f_{mod}$ and $f_{Illu}$ are obtained. For example, the combined PLL structure may be a dedicated PLL circuit enabling output of two stable signals with coupled frequencies.

Figure 3A:
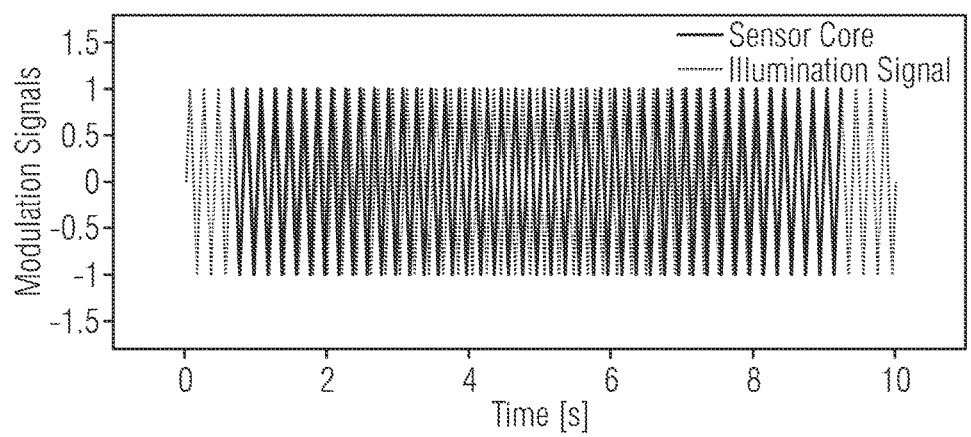
FIG. 3A shows a time plot of modulated sensor core and illumination signals having a frequency difference of 0.1 Hz over 10 seconds.

FIG. 3A shows an example time plot of modulated sensor core and illumination signals having a frequency difference of 0.1 Hz over 10 seconds. The time plot shows an evolution of the phase shift between the sensor core (pixel) modulation signal $f_{mod}$ and the illumination modulation signal $f_{Illu}$ such that the signals are completely in phase (e.g., 0°) at 0 seconds, completely out of phase by 180° at 5 seconds, and back in phase (e.g., 360°) at 10 seconds. Thus, a linear sweep over full measurement range can be performed by the sensor core 7 within 10 seconds. Since the start of both modulation signals $f_{mod}$ and $f_{Illu}$ can be chosen to happen in a synchronous manner, and the frame rate (i.e., a time between 3DI image acquisitions) can be programmed arbitrarily, any possible value of the sensor response function (sensor signal over phase difference of light with respect to the pixel modulation $f_{mod}$) can be acquired in a simple and automated way just by changing the frequency difference between the illumination modulation signal $f_{Illu}$ and the sensor core modulation signal $f_{mod}$.

Figure 3B:
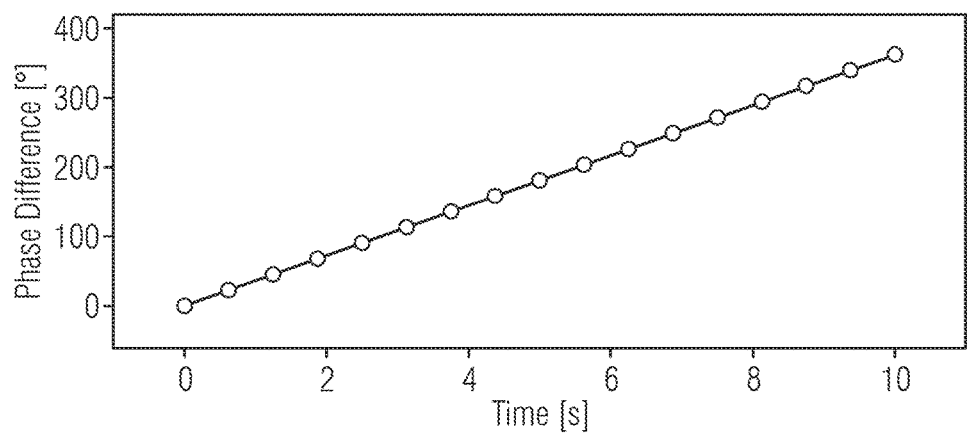
FIG. 3B shows a time plot of a linear increase of a phase difference between the modulated sensor core and illumination signals having a frequency difference of 0.1 Hz over 10 seconds.

FIG. 3B shows an example time plot of a linear increase of the phase difference between the modulated sensor core and illumination signals having a frequency difference of 0.1 Hz over 10 seconds. In particular, FIG. 3B shows sample points for all 10° phase difference steps using a frequency difference of 10% of the nominal frequency.

A start of both modulation signals (i.e., the sensor core signals and the illumination signal) may be selected to occur in a synchronous manner, though not necessarily required, and a frame rate (i.e., a time between 3DI image frame acquisitions) can be programmed arbitrarily. In the case the modulation signals are not initially synchronized, an additional 4-phase depth measurement may be used to obtain an initial phase difference when the object distance is known.

The processing unit 14 may include one or more processors, such as one or more central processing units (CPUs), digital signal processors (DSPs), general purpose microprocessors, application specific integrated circuits (ASICs), field programmable logic arrays (FPGAs), or other equivalent integrated or discrete logic circuitry, and may be configured to control the sequence controller 13 as well as to process raw image data received from the sensor core 7 (i.e., from the pixels of the pixel array 6). For example, a Camera Serial Interface 2 (CSI-2) may be used to output the (digital) raw image data from the sensor core 7 to the processing unit 14.

Well-defined phase differences or steps (time-delays) are introduced, by way of the predetermined frequency difference, between the illumination signal (and thus the modulated IR light) and the sensor core modulation signal $f_{mod}$, which may be used for calculating the full unambiguous phase difference and from that calculate the measured depth on a per pixel basis.

Accordingly, the processing unit 14 may be configured to receive the raw image data and perform a depth map calculation to determine an amplitude (i.e., the intensity of the received reflected modulated light) and depth (e.g., calculated from the phase difference between the received reflected IR light and the sensor core modulation) for each pixel derived from the raw image data.

For example, processing unit 14 may use four so-called phase images (e.g., four measurements) at well-defined phase differences or phase steps introduced by the PLLs 11 and 12 to estimate the phase difference between the reflected modulated light and the sensor core modulation signal as used for calculation of the depth of an object 2 per sensor pixel. The phase differences may be, for example, 0°/90°/180°/270°, but are not limited thereto. In fact, while the shift between each phase difference may be congruent (e.g., 90°), the shift may also not be congruent. That is, the shift in phase differences between image acquisitions may be arbitrarily set such that they are not equidistant with respect to each other.

The amplitude and depth are then output by the processing unit 14 to generate an image that represents the 3D scene 2. The depth calculation by processing unit 14 may be based on a determination of the absolute phase difference between the received reflected modulated light and the sensor modulation signal $f_{mod}$.

Due to the ambiguity in phase information, any unambiguous phase estimation for a certain modulation frequency is connected to a certain so-called unambiguity range $\Delta z_{max}$ for the depth measurement, given by $\Delta z_{max} = \Delta_{Illu}/2 = (c/f_{Illu})/2$ with $f_{Illu}$ and $\lambda_{Illu}$ being the modulation frequency and the modulation wavelength of the used illumination modulation signal, and c is the speed of light of the given propagation medium (in most cases air). For example, for a modulation frequency of 60 MHz the unambiguity range for depth measurement is given by $\Delta z_{max\_60} = 5$ m/2=2.5 m.

To obtain a larger unambiguous range multiple depth measurements for different modulation frequencies might be used, e.g., utilizing phase difference (or depth) estimations for $f_{Illu}$=60 MHz and for $f_{Illu}$=80 MHz to estimate depth over the extended unambiguity range of $\Delta z_{max\_60/80}$=7.5 m. The processing unit 14 may therefor utilize phase difference estimations (or depth estimations) from one or more modulation frequencies for deriving the final (combined) depth measurement over an possibly extended unambiguity range.

Each pixel of the pixel array 6 generates analog raw image data, including at least one of amplitude information representing the reflected light intensity and depth measurement information representing phase information within reflected modulated light, based on the reflected light signal, and outputs the raw analog image data to an ADC to be converted into raw digital image data. Thus, in order to obtain a 3D image, a sequence of a defined number of images may be obtained with a known, but different, arbitrary phase differences between the sensor core 7 modulation signal $f_{mod}$ and the illumination modulation signal $f_{Illu}$ (e.g., four different phase steps).

The image acquisitions may be used to calculate the absolute phase difference between the reflected modulated light and the sensor core modulation signal $f_{mod}$, enabling the processing unit 14 to calculate a depth (i.e., a distance between the sensor and the object in line-of-sight of each pixel) for each pixel of the pixel array 6. Image acquisitions from different modulation frequencies might be used to estimate depth information for an extended unambiguity range, where the phase difference estimation (thus depth measurement) may be calculated separately for each modulation frequency, and are then utilized for the extended range depth measurement (as described above).

The sensor core 7 may include one or more processors or control logic units, and is configured to sense and measure a time-of-flight of the light signal based on a phase difference measurement using the pixel array 6 as a sensor. In particular, each pixel is a sensor element configured to receive the reflected IR light signal and demodulate the reflected modulated light signal using a modulation signal $f_{mod}$ provided to the sensor core 7.

The sensor core 7 may be configured to implement a four point depth measurement algorithm, such that four phase measurements are performed with four known phase shifts (e.g., shifted by an arbitrary amount from each other by the PLLs 11 and 12 controlled by a sequence controller 13) which allows to the processing unit 14 to estimate depth over the full unambiguous measurement range of the sensor core 7 for the given modulation frequency $f_{mod}$.

The sensor core 7 may also be configured to use two (or more) four-point depth measurements at different modulation frequencies (e.g., 60 MHz and 80 MHz) in order to extend the unambiguity range of the ToF camera. In this case, the unambiguity range is given by the inverse of the frequency difference between the two different modulation frequencies. Here, four-point depth measurements for each single modulation frequency are performed and the results of each measurement are combined to calculate distance at an extended measurement range.

The sensor core 7 may be configured with an integration time (i.e., the opening of the sensor pixels) of the reflected light signal may be in the range of 0.1-10 ms, but is not limited to this range. The sensor core 7 may be configured with an acquisition time (i.e., a time between different measurement samples) to make samples of the reflected light signal at constant (each 0.1 second or each 1.0 second) or arbitrary frame rate (i.e., time instances) to set up a linearly increasing additional phase difference for each pixel due to the introduced frequency difference between the illumination modulation signal $f_{Illu}$ and the sensor core modulation signal $f_{mod}$. The introduced frequency difference leads to an artificial distance evolution, which is estimated from the sensor readings (i.e., measurement signals) and is provided as a sensor response function.

According to the time difference between the individual image samples, an expected (linearly increased) phase difference, i.e., artificial depth, is known based on the known frequency difference, and can be compared to a depth measurement calculated from the sensor response function obtained by the pixel readouts of the pixel array 6. Thus, the time difference between individual image acquisitions is coded to the phase difference (or depth difference) of the sample points of the obtained sensor response function.

The pixel array 6 may be integrated together with mixed signal circuitry of the sensor into a single chip (i.e., sensor chip 3) by, for example, a complementary metal-oxide-semiconductor (CMOS) process. It will be further appreciated that the sequence controller 13 and/or the processing unit 14 may also be integrated on the sensor chip 3, as shown in FIG. 2, or may be provided on one or more separate dies.

During image sensing, the modulation frequency of ToF pixels on the sensor core 7 is synchronous to the modulation frequency of the illumination signal which defines the waveform of the active scene illumination, but may possibly include a known, defined arbitrary phase shift (e.g., introduced by the PLLs 11 and 12). Modulation frequencies may be in the range of 30 to 100 MHz, but are not limited to such. In addition, a frame rate may also be arbitrary (i.e., not constant in time), as long as the time difference between each image acquisition, which will be the simulated phase or distance difference, is known.

As noted above, a small frequency difference is introduced for the modulation signals on sensor core 7 (e.g., for the ToF pixels) with respect to the modulation signal modulating the light source 4, e.g., a frequency difference in the range of 0.1 Hz to 1000 Hz may be used but is not limited thereto. For example, a modulation frequency of the illumination signal may differ by 1 Hz compared to the modulation signals of the ToF pixels. After a period of time, $\Delta t$, two signals, for example, initially synchronized in phase but differing in frequency $\Delta f$ (in Hz) will develop a linearly with time changing total phase shift ($\Delta \Phi$). Accordingly, the phase difference between the two signals (in radians) after time $\Delta t$ is given by $\Delta \Phi = 2 \times pi \times \Delta f \times \Delta t$. Thus, the frequency difference $\Delta f$ leads to a well-defined phase shift or phase difference between the sensor core modulation and the illumination signal modulation linearly growing with time, dependent on the inverse of the frequency difference.

The phase difference between the sensor core modulation and the reflected illumination signal modulation may be detected by the sensor core 7 in terms of pixel-wise demodulation and generation of pixel raw data. This pixel raw data contains an unknown amplitude and phase offset due to unknown reflectivity of the measured object 2, distance dependency of reflected light intensity, and possible constant phase offset. To cope for the unknown amplitude and phase offset, multiple measurements (image acquisitions) with well-defined artificial phase differences (e.g., four phase steps at different phase values) are used to provide a means for calculating the phase difference over the full unambiguous phase range of $2\pi$ radians. From the phase difference, the object distance (depth) may be calculated.

According to one or more embodiments, a full pixel-wise sensor response function can be acquired, which is the pixel-wise raw data over absolute phase difference or calculated distance—if needed for each additional phase step as used for depth measurement in the 3DI application. Thus, the introduced linearly increasing (or decreasing) phase difference can be translated to a simulated, but highly accurate, evolution of object distance (depth), and for every image acquisition time (i.e., a time of image acquisition with reference to a start time of modulation) the introduced artificial, but very accurate object distance, can be calculated based on the known frequency difference and the evolved time. Thus, a linearly increasing (or decreasing) phase shift introduces a linearly with time increasing (or decreasing) simulated additional object distance to the object 2 (i.e., the 3D scene). For example, a frequency difference of 0.1 Hz leads to the full 360° phase shift for a time duration of 10 seconds, covering the full possible phase difference range of the 3DI system. Thus, for that case, a linear sweep over full measurement range can be performed by the sensor core 7 within 10 seconds.

According to one or more embodiments, the processing unit 14 may select a plurality of phase differences between the modulation signals $f_{mod}$ and $f_{Illu}$, where a phase difference is selected for at least part of each image acquisition (e.g., all or part of an integration time, and/or all or part of a waiting time). The processing unit 14 may further determine different acquisition times, including determining an acquisition time for each of the plurality of image acquisitions based on the predetermined frequency difference configured for a corresponding image acquisition and based on the phase difference configured for the corresponding image acquisition. Thus, the processing unit 14 may control the sensor core 7 to take image acquisitions at the determined acquisition times with predetermined chosen frequency differences for part(s) of the acquisition times. In other words, the processing unit 14 may trigger an image acquisition at time corresponding to a desired phase difference.

As noted above, the control unit (e.g., the processing unit 14 and/or the sequence controller 13) may set the predetermined frequency difference between the modulation signals $f_{mod}$ and $f_{Illu}$ to be greater than zero for all or part of an integration time, all or part of a waiting time, or for all or part of an image acquisition time for each of a multiple image acquisitions taken at different image acquisition times. At other times, the frequencies of the modulation signals $f_{mod}$ and $f_{Illu}$ may be equal such that there is no frequency difference therebetween (i.e., the frequency difference is zero). Other times may also include one or more full image acquisitions or series of full image acquisitions during which there is no frequency difference.

Different combinations of frequency difference/no frequency difference may have different uses. For example, high accuracy depth measurements at all pixels may be achieved without a need for calibration in advance. With this principle all possible phase differences can be obtained in a simple manner; thus, increasing possible depth measurement accuracy. In other cases, fast object tracking at frame rates greater than 400 Hz may be achieved, e.g., by a new depth estimation after another image acquisition when it can be assumed that the sensor response function for the certain object remains not significantly changed or substantially unchanged. A continuously changing phase, that changes linearly with time, between pixel modulation and illumination signal may also lead to smoothing of the so-called sensor-response function, thus, reducing the wiggling error. A zero detector mode may also be implemented by driving the 3DI sensor camera 1 in a compensated principle, where the phase difference (easily measured on-chip) can be controlled to compensate for an object distance related phase difference. For example, the frequency difference can be controlled such that the phase difference is constant regardless of a (changing) distance to the object 2. Thus, driving the sensor in maximum sensitivity, and enabling fastest tracking of object distances, or more accurate depth measurements may be achieved.

Accordingly, the control unit 10 may be configured to set the predetermined frequency difference for at least one of: at least a portion of the integration time for each of the plurality of image acquisitions or at least a portion of the waiting time for each of the plurality of image acquisitions.

For example, the control unit 10 may be configured to set the predetermined frequency difference at a constant value greater than zero during at least part of the waiting time such that the phase difference between modulation signals $f_{mod}$ and $f_{Illu}$ continuously changes during the at least part of the waiting time. Here, the frequency difference may be set at a constant value greater than zero for the entire waiting time, or only a portion thereof. As a result, the phase difference between the modulation signals $f_{mod}$ and $f_{Illu}$ constantly (linearly) changes over the time period in which the frequencies are different.

In addition, under this example, the control unit 10 may be configured to set the frequencies of the modulation signals $f_{mod}$ and $f_{Illu}$ to be the same during the entire integration time such that the phase difference between the modulation signals $f_{mod}$ and $f_{Illu}$ is constant (i.e., does not change) during the integration time.

For each image acquisition of a sequence of image acquisitions, the frequency difference may be set to the same value and may be initiated over the same portion and same duration within a corresponding waiting time. In other situations, the frequency difference may be set at different values for some or all of the different image acquisitions of the sequence of image acquisitions. For example, the control unit 10 may be configured to set the predetermined frequency difference for the waiting time of a first image acquisition to be different than the predetermined frequency difference for the waiting time of a second image acquisition.

In another example, the control unit 10 may be configured to set the predetermined frequency difference at a constant value greater than zero during at least part of the integration time such that the phase difference between the modulation signals $f_{mod}$ and $f_{Illu}$ continuously changes during the at least part of the integration time. Here, the frequency difference may be set at a constant value greater than zero for the entire integration time, or only a portion thereof.

In addition, under this example, the control unit 10 may be configured to set the frequencies of the modulation signals $f_{mod}$ and $f_{Illu}$ to be the same during the entire waiting time such that the phase difference between the modulation signals $f_{mod}$ and $f_{Illu}$ is constant (i.e., does not change) during the waiting time.

For each image acquisition of a sequence of image acquisitions, the frequency difference may be set to the same value and may be initiated over the same portion and same duration within a corresponding integration time. In other situations, the frequency difference may be set at different values for some or all of the different image acquisitions of the sequence of image acquisitions. For example, the control unit 10 may be configured to set the predetermined frequency difference for the integration time of a first image acquisition to be different than the predetermined frequency difference for the integration time of a second image acquisition.

In another example, the control unit 10 may be configured to set the predetermined frequency difference at a constant value greater than zero during at least part of the integration time and during at least part of the waiting time such that the phase difference between the modulation signals $f_{mod}$ and $f_{Illu}$ continuously changes during the at least part of the integration time and during the at least part of the waiting time.

The frequency difference may be set to the same value or to different values for both the portion of the integration time and the portion of the waiting time. Furthermore, combinations of same or different values for the frequency difference may be used across a sequence of image acquisitions for their respective integration and waiting times.

In another example, the control unit 10 may be configured to set the predetermined frequency difference at a first constant value greater than zero during at least part of the integration time such that the phase difference between the modulation signals $f_{mod}$ and $f_{Illu}$ continuously changes at a first rate during the at least part of the integration time, and the control unit 10 may be configured to set the predetermined frequency difference at a second constant value greater than zero, different from the first constant value, during at least part of the waiting time such that the phase difference between the modulation signals $f_{mod}$ and $f_{Illu}$ continuously changes at a second rate during the at least part of the waiting time.

A same value or different values for the first constant value for each integration time may be used across a sequence of image acquisitions and a same value or different values for the second constant value for each waiting time may be used across the sequence of image acquisitions.

Thus, based on a timing of the frequency difference between the modulation signals $f_{mod}$ and $f_{Illu}$ controlled by the control unit 10, a time-dependent phase difference between the modulation signals $f_{mod}$ and $f_{Illu}$ may be induced such that the phase difference changes linearly and continuously over time.

The control unit 10 may also be configured to change the predetermined frequency difference over a plurality of image acquisitions such that the phase difference between the modulation signals $f_{mod}$ and $f_{Illu}$ is changed between individual image acquisitions of the plurality of image acquisitions.

The control unit 10 may also be configured to manipulate the predetermined frequency difference arbitrarily over the plurality of image acquisitions such that the predetermined frequency difference is not changed in a constant or congruent manner from one image acquisition to the next image acquisition.

On the other hand, the control unit 10 may also be configured to manipulate the predetermined frequency difference such that the predetermined frequency difference is maintained constant over the plurality of image acquisitions over a same portion of integration time and/or waiting time.

The control unit 10 may also be configured to select a number of image acquisitions used for one depth calculation based on a desired depth measurement accuracy, a desired measurement sensitivity, or a desired object tracking rate. For example, a number of image acquisitions may be increased to achieve higher accuracy or sensitivity, but may be decreased to achieve faster object tracking.

For example, the larger the number of image acquisitions provides a higher number of phase difference values acquired. The larger the number of acquired phase difference values, the more precise the estimation of the absolute phase difference may be depending on the chosen phase difference values. Since the frequency difference and timing of each image acquisition is known, and since the (absolute) phase difference is coded into time, an image depth (distance) can be determined based on the calculated absolute phase difference.

The control unit 10 may also be configured to induce a continuous change of the phase difference between the modulation signals $f_{mod}$ and $f_{Illu}$ over time to more than a 360° phase shift.

In view of the above, a 3DI system may include a modulator configured to generate a first modulation signal having a first modulation frequency and a second modulation signal having a second modulation frequency; an illumination source configured to generate a modulated light signal based on the first modulation signal; a sensor core including a pixel array modulated by the second modulation signal, where at least one pixel of the pixel array is configured to receive the modulated light signal reflected from an object as a reflected modulated light signal and to demodulate the reflected modulated light signal using the second modulation signal during an image acquisition to generate a measurement signal, where the at least one pixel is configured to generate a plurality of measurement signals based on a plurality of image acquisitions taken at different acquisition times; and a control unit including at least one processor.

The control unit may be configured to: control a phase difference between the first modulation signal and the second modulation signal by setting the first modulation frequency and the second modulation frequency to have a predetermined frequency difference greater than zero; control the sensor core to initiate the plurality of image acquisitions at the different acquisition times; receive the plurality of measurement signals; and calculate a depth of the object based on the plurality of measurement signals, where the depth is a distance from the 3DI system to the object In addition, a method of measuring a depth of an object by a 3DI system may include generating a first modulation signal having a first modulation frequency; generating a second modulation signal having a second modulation frequency; generating a modulated light signal based on the first modulation signal; modulating a pixel array by the second modulation signal; generating a plurality of measurement signals based on a plurality of image acquisitions taken at different acquisition times based on at least one pixel of the pixel array receiving the modulated light signal reflected from the object as a reflected modulated light signal; controlling a phase difference between the first modulation signal and the second modulation signal by setting the first modulation frequency and the second modulation frequency to have a predetermined frequency difference greater than zero; initiating the plurality of image acquisitions at the different acquisition times; receiving the plurality of measurement signals; and calculating the depth of the object based on the plurality of measurement signals, where the depth is a distance from the 3DI system to the object.

FIG. 4 illustrates a flow diagram of a depth measurement operation 400 according to one or more embodiments. While the flow diagram depicts a series of sequential operations, unless explicitly stated, no inference should be drawn from that sequence regarding specific order of performance, performance of operations or portions thereof serially rather than concurrently or in an overlapping manner, or performance of the operations depicted exclusively without the occurrence of intervening or intermediate operations. The process depicted in the example is implemented by, for example, one or more time-of-flight sensor systems described above.

The depth measurement operation 400 includes setting up an image acquisition sequence (operation 405); setting up a modulation sequence of PLLs with known frequency difference $\Delta f$ for at least a portion of an integration time and/or at least a portion of a waiting time for each image acquisition (operation 410); starting a modulation at the sensor core and at the illumination output operation 415); starting illumination and image acquisition (operation 420); acquiring images using the modulation sequence and image acquisition sequence (operation 425); generating measurement signals on a pixel basis based on image acquisitions (operation 430); and calculating depth of a 3D scene on a pixel basis based on the measurement signals (operation 435).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Depending on certain implementation requirements, embodiments provided herein can be implemented in hardware or in software. The implementation can be performed using a computer readable, digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A three-dimensional image (3DI) system comprising:
a modulator configured to generate a first modulation signal having a first modulation frequency and a second modulation signal having a second modulation frequency;
an illumination source configured to generate a modulated light signal based on the first modulation signal;
a sensor core including a pixel array modulated by the second modulation signal, wherein at least one pixel of the pixel array is configured to receive the modulated light signal reflected from an object as a reflected modulated light signal and to demodulate the reflected modulated light signal using the second modulation signal during an image acquisition to generate a measurement signal, wherein the at least one pixel is configured to generate a plurality of measurement signals based on a plurality of image acquisitions taken at different acquisition times; and a control unit including at least one processor, the control unit configured to:

control a phase difference between the first modulation signal and the second modulation signal by setting the first modulation frequency and the second modulation frequency to have a predetermined frequency difference greater than zero;

control the sensor core to initiate the plurality of image acquisitions at the different acquisition times;

receive the plurality of measurement signals, and calculate a depth of the object based on the plurality of measurement signals, wherein the depth is a distance from the 3DI system to the object.

2. The 3DI system of claim 1, wherein the at least one processor is configured to:

select a plurality of phase differences between the first modulation signal and the second modulation signal, wherein the at least one processor is configured to select the phase difference for at least part of each image acquisition, and determine the different acquisition times, including determining an acquisition time for each of the plurality of image acquisitions based on the predetermined frequency difference configured for a corresponding image acquisition and based on the phase difference configured for the corresponding image acquisition.

3. The 3DI system of claim 1, wherein each of the different acquisition times includes an integration time and a waiting time subsequent to the integration time, and the control unit is configured to set the predetermined frequency difference for at least one of:

at least a portion of the integration time for each of the plurality of image acquisitions or at least a portion of the waiting time for each of the plurality of image acquisitions.

4. The 3DI system of claim 1, wherein each of the different acquisition times includes an integration time and a waiting time subsequent to the integration time, the control unit is configured to set the predetermined frequency difference at a constant value during at least part of the waiting time such that the phase difference between the first and the second modulation signal continuously changes during the at least part of the waiting time, and the control unit is configured to set the first modulation frequency and the second modulation frequency to be the same during the integration time such that the phase difference between the first and the second modulation signal is constant during the integration time.

5. The 3DI system of claim 1, wherein each of the different acquisition times includes an integration time and a waiting time subsequent to the integration time, the control unit is configured to set the predetermined frequency difference at a constant value during at least part of the integration time such that the phase difference between the first and the second modulation signal continuously changes during the at least part of the integration time, and the control unit is configured to set the first modulation frequency and the second modulation frequency to be the same during the waiting time such that the phase difference between the first and the second modulation signal is constant during the waiting time.

6. The 3DI system of claim 1, wherein each of the different acquisition times includes an integration time and a waiting time subsequent to the integration time, and the control unit is configured to set the predetermined frequency difference at a constant value during at least part of the integration time and during at least part of the waiting time such that the phase difference between the first and the second modulation signal continuously changes during the at least part of the integration time and the at least part of the waiting time.

7. The 3DI system of claim 1, wherein each of the different acquisition times includes an integration time and a waiting time subsequent to the integration time, the control unit is configured to set the predetermined frequency difference at a first constant value during at least part of the integration time such that the phase difference between the first and the second modulation signal continuously changes at a first rate during the at least part of the integration time, and the control unit is configured to set the predetermined frequency difference at a second constant value, different from the first constant value, during at least part of the waiting time such that the phase difference between the first and the second modulation signal continuously changes at a second rate during the at least part of the waiting time.

8. The 3DI system of claim 1, wherein the predetermined frequency difference induces a time-dependent phase difference between the first modulation signal and the second modulation signal such that the phase difference between the first and the second modulation signal is changed over time.

9. The 3DI system of claim 1, wherein the control unit is configured to change the predetermined frequency difference over the plurality of image acquisitions such that the phase difference between the first modulation signal and the second modulation signal is changed between individual image acquisitions of the plurality of image acquisitions.

10. The 3DI system of claim 1, wherein the control unit is configured to manipulate the predetermined frequency difference arbitrarily over the plurality of image acquisitions.

11. The 3DI system of claim 1, wherein the control unit is configured to maintain the predetermined frequency difference to be constant over the plurality of image acquisitions.

12. The 3DI system of claim 1, wherein the control unit is configured to select a number of image acquisitions used for one depth calculation based on a desired depth measurement accuracy, a desired measurement sensitivity, or a desired object tracking rate.

13. The 3DI system of claim 1, wherein the control unit is configured to continuously change the phase difference over time to more than a 360° phase shift.

14. The 3DI system of claim 1, wherein the predetermined frequency difference is different for at least two of the plurality of image acquisitions.

15. The 3DI system of claim 1, wherein the predetermined frequency difference is the same for at least two of the plurality of image acquisitions.

16. The 3DI system of claim 1, wherein each of the different acquisition times includes an integration time and a waiting time subsequent to the integration time, plurality of image acquisitions includes a first image acquisition and a second image acquisition, and the control unit is configured to set the predetermined frequency difference for the integration time of the first image acquisition to be different than the predetermined frequency difference for the integration time of the second image acquisition.

17. The 3DI system of claim 1, wherein each of the different acquisition times includes an integration time and a waiting time subsequent to the integration time,
   plurality of image acquisitions includes a first image acquisition and a second image acquisition, and
   the control unit is configured to set the predetermined frequency difference for the waiting time of the first image acquisition to be different than the predetermined frequency difference for the waiting time of the second image acquisition.

18. The 3DI system of claim 1, wherein the modulator includes a first phase-locked loop (PLL) circuit configured to generate the first modulation signal and a second PLL circuit configured to generate the second modulation signal, wherein the first PLL circuit and the second PLL circuit are coupled to each other.

19. The 3DI system of claim 1, wherein the modulator includes a phase-locked loop (PLL) circuit configured to generate the first modulation signal and the second modulation signal, wherein the first modulation frequency and the second modulation frequency are derived from a common clock source.

20. A method of measuring a depth of an object by a three-dimensional image (3DI) system, the method:
   generating a first modulation signal having a first modulation frequency;
   generating a second modulation signal having a second modulation frequency;
   generating a modulated light signal based on the first modulation signal;
   modulating a pixel array by the second modulation signal;
   generating a plurality of measurement signals based on a plurality of image acquisitions taken at different acquisition times based on at least one pixel of the pixel array receiving the modulated light signal reflected from the object as a reflected modulated light signal;
   controlling a phase difference between the first modulation signal and the second modulation signal by setting the first modulation frequency and the second modulation frequency to have a predetermined frequency difference greater than zero;
   initiating the plurality of image acquisitions at the different acquisition times;
   receiving the plurality of measurement signals; and
   calculating the depth of the object based on the plurality of measurement signals, wherein the depth is a distance from the 3DI system to the object.

* * * * *